United States Defensive Publication [19] (H) [11] T103,601

Repetti [43] Nov. 1, 1983

[54] PROCESS FOR PREPARATION OF MICROPOROUS MEMBRANES OF CONTROLLED FLOW CHARACTERISTICS

[76] Inventor: Ronald V. Repetti, 9 Marshall St., Old Greenwich, Conn. 06870

[21] Appl. No.: 446,832

[22] Filed: Dec. 3, 1982

Related U.S. Application Data

[63] Continuation of Ser. No. 334,771, Dec. 28, 1981, abandoned, which is a continuation of Ser. No. 201,086, Nov. 27, 1980, abandoned.

[51] Int. Cl.[3] ..... B29D 27/04

[52] U.S. Cl. ..... 264/41; 210/500.2; 264/216; 264/DIG. 62; 428/315.5

[57] ABSTRACT

A dimensionally stabilized microporous polyamide membrane having enhanced flow characteristics comprised of a film forming organic polymeric material of low shrinkage prepared by drying the membrane, under conditions of restraint in the plane of the membrane to minimize the shrinkage until the membrane is essentially in a dried condition. A process is also described for preparing a microporous membrane designed to enhance incorporation and retention of a charge modifying resin for use as a charge modified filter media. The process comprises preparing a dope solution of a film forming polymer in a solvent system, directly casting the solution under the surface of a quenching medium comprising a non-solvent system for the polymer for a time sufficient to form micropores in the film, and drying the film while controlling the planar dimensions of the film during the drying.

The foregoing process is particularly useful in the preparation of a charge modified membrane of enhanced electrokinetic capture potential in the filtration of charged submicronic contaminants from aqueous liquids.

16 Claims, No Sheets Drawing,

25 Pages Specification

The file of this unexamined application may be inspected and copies thereof may be purchased (849 O.G. 1221, Apr. 9, 1968).